United States Patent

[11] 3,568,012

[72] Inventors Wentworth A. Ernst
Catonsville;
Charles W. Wyble, Baltimore, Md.

[21] Appl. No. 773,586
[22] Filed Nov. 5, 1968
[45] Patented Mar. 2, 1971
[73] Assignee Westinghouse Electric Corporation
Pittsburgh, Pa.
Continuation-in-part of application Ser. No. 706,398, Feb. 19, 1968, now abandoned.

[54] A MICROMINIATURE CIRCUIT DEVICE EMPLOYING A LOW THERMAL EXPANSION BINDER
5 Claims, 8 Drawing Figs.

[52] U.S. Cl. 317/234, 260/37, 317/235
[51] Int. Cl. H01l 1/10
[50] Field of Search 317/234, 235; 317/1, 3, 4, 5.4, 22, 29; 260/37; 260/37 (N)

[56] References Cited

OTHER REFERENCES

Journal of the American Ceramic Society, Thermal Expansion Properties of Some Synthetic Lithia Minerals, by F. A. Hummel, Aug. 1951, pages 235 to 239.

*Primary Examiner*—John W. Huckert
*Assistant Examiner*—R. F. Polissack
*Attorneys*—F. Shapoe and Alex Mich, Jr.

ABSTRACT: A low thermal expansion insulating cement is formulated from a high temperature resinous varnish and a finely divided inert inorganic filler having a negative coefficient of thermal expansion. The composition is employed as an insulator and binder in microminiature circuit devices employing microminiature circuit elements.

PATENTED MAR 2 1971 3,568,012

WITNESSES
Daniel P. Cillo
James F. Young

INVENTORS
Wentworth A. Ernst &
Charles W. Wyble
BY Alex Mich, Jr.
ATTORNEY

A MICROMINIATURE CIRCUIT DEVICE EMPLOYING A LOW THERMAL EXPANSION BINDER

CROSS-REFERENCE TO RELATED APPLICATIONS

This application is a continuation-in-part of our pending application U.S. Ser. No. 706,398, filed Feb. 19, 1968 now abandoned.

BACKGROUND OF THE INVENTION

In the past decade there has been a concerted effort to reduce the size of electronic circuits so as to conserve space, reduce weight and increase reliability. However, as one gets down to microminiature circuits the difficulties in providing small terminal areas, close conductor spacings and adequate insulation of the microminiature circuit elements are increased.

It is the present practice in semiconductor manufacture to attach semiconductor elements to interconnecting supporting structures and packages such as flat packs by means of eutectic bonding. This bonding is accomplished by heating the package to the eutectic temperature of Gold-Silicon alloy, and scrubbing the silicon device into the gold surface of the package. Disadvantages of this process are that printed conductors cannot pass beneath the silicon elements because this would electrically short the device and low packaging density.

In microcircuits, the conductor interconnections generally can absorb any relative motion due to differential expansion between the elements and the substrate. In the smaller microminiature circuit devices this problem becomes increasingly difficult because the conductors are much thinner and shorter. There, in some cases, the substrate can be made with a plurality of cavities into which microminiature elements such as resistors, semiconductor units or any other active or passive electronic element or a plurality of such elements in integrated form may be placed. In such assemblies the microminiature elements are held in place by an insulating cement and the conductor interconnections to thin film circuits on the substrate are made by means such as vacuum deposition. The insulating cement or binder in this case can also act as a bridge for the interconnection conductors between the recessed microminiature elements and the substrate.

Differential expansion between dissimilar materials, if concentrated at the area of a small bridging electric conductor can introduce severe cyclic elongation and contraction of the conductor as the temperature changes. Therefore in microminiature assemblies which may experience substantial temperature changes it is important to match the coefficients of thermal expansion of the microminiature circuit elements, interconnection conductors, substrate and insulating cement. It is especially important that the cement have a low coefficient of thermal expansion so that expansion and contraction is kept to a minimum. Other essential qualities needed in the cement are: excellent insulating properties, adequate humidity resistance, excellent bond strength, good thermal shock properties, good screenability and ability to accept a deposited conductor with good adhesion of conductor to binder material. The cement must also provide a continuous surface free from voids, cracks or other abrupt surface imperfections that would interfere with subsequent conductor deposition or that would tend to concentrate failure inducing stresses at the conductor.

SUMMARY

Accordingly it is the general object of this invention to provide a new and improved high temperature, low thermal expansion insulating cement composition.

Another object of this invention is to provide a new and improved microminiature circuit device.

Briefly, the present invention accomplishes the above cited objects by bonding circuit elements onto glass or alumina substrates or into cavities in glass or alumina substrates with a new and improved insulating cement, curing the cement binder composition and interconnecting the circuit elements and a plurality of thin film circuits on the substrate.

This invention solves the problem of formulating an ideal insulating cement composition for use with circuit elements in a circuit assembly possessing the aforementioned essential qualities and which can be fully cured to improve its overall reliability without subsequent cracking.

The use of the binder of this invention allows interconnecting conductors to pass beneath circuit elements attached directly to the substrate. The result is that more devices may be packaged within a single structure so that electronic assemblies may be lighter in weight, simpler to fabricate and maintain, and cost less to produce.

BRIEF DESCRIPTION OF THE DRAWINGS

Further objects and advantages of the invention will become apparent as the following description proceeds and features of novelty which characterize the invention will be pointed out with particularity in the claims annexed to and forming a part of this specification.

For a better understanding of the invention, reference may be had to the accompanying drawings, in which.

DESCRIPTION OF THE PREFERRED EMBODIMENTS

It has now been discovered that microminiature circuit devices employing microminiature elements can be made to withstand substantial temperature changes with an insulating cement composition that, in accordance with this invention, contains a finely divided inorganic filler having a negative coefficient of thermal expansion and a heat resistant resin. A thixotroping agent may be included to make the composition suitable for convenient application.

Figure 1:
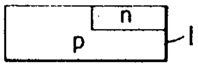
FIG. 1 is a cross-sectional view of a microminiature circuit element, in this case a microdot chip semiconductor.

Referring now to FIG. 1, a microminiature element 1 as for example a body of semiconductor material such as silicon is shown composed of an N-type silicon, a P-type silicon and a P-N junction. The microminiature element can be any active or passive electronic element or a plurality of such elements in integrated form. The circuit element may be round, square or of other configuration. The circuit elements can be in microdot chip form and generally consist of an individual semiconductor component produced in situ on glass or silicon substrates. These microdots can vary in size, generally ranging from 0.003 to 0.03 inch in height and from 0.03 to 0.06 inch in diameter.

Figure 2:
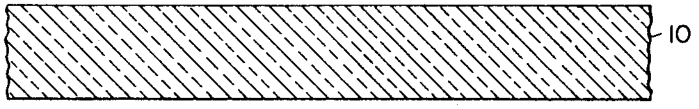
FIG. 2 is a cross-sectional view of the substrate.

FIG. 2 shows the substrate. The substrate used in microminiature circuitry must be chosen carefully because its surface can influence the component's crystal orientation and because its physical and mechanical characteristics can affect the operation of the microminiature circuit device. In general the substrate material should have a combination of low electrical conductivity and low dielectric constant. Overly high conductivity can cause shorting and leakage. A high dielectric constant can induce distributive capacitance and an accompanying undesirable effect on circuit performance. In addition, materials for high power density circuits where a large amount of heat is generated, should have a high coefficient of thermal conductivity and high emissivity and specific heat.

Some materials used for such substrates are: soda lime, borosilicate and fused silica glasses; aluminum and beryllium oxide ceramics; and high-temperature silicone and fluorocarbon resins. Soda lime glass is the most commonly used substrate material due to its low cost and low surface roughness. It has a thermal expansion of $4.8 \times 10^{-6}$ per °F. If lower thermal expansion can be tolerated, then borosilicate glass ($1.1 \times 10^{-6}$ per °F. and fused silica ($0.3 \times 10^{-6}$ per °F.) are more suitable because of their better thermal shock properties.

FIGS. 3—7 show one embodiment of this invention wherein the low thermal expansion binder is used to cement microminiature elements such as semiconductor units into recessed cavities in the substrate. It is to be understood that the elements may be cemented, without being recessed, directly to the substrate surface to form the circuit device, a plurality of which may be assembled to provide an electrical package of microminiature circuit devices.

Figure 3:
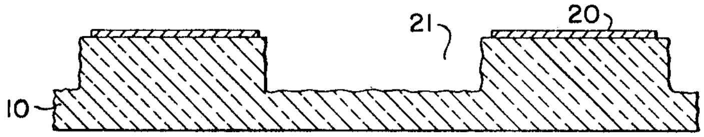
FIG. 3 is a cross-sectional view of the substrate after deposition of thin film circuitry and after cavities have been ground out.

FIG. 3 shows a cavity 21 in the substrate 10. The cavities can be introduced into the substrate through ultrasonic impact grinding or other known processes. Also shown is the thin film circuitry 20 on the surface of the substrate.

Figure 4:
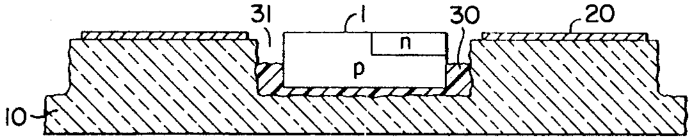
FIG. 4 is a cross-sectional view after the microminiature circuit element has been inserted into the cavity.

FIG. 4 shows the assembly after the microminiature element has been inserted into the cavity on top of sufficient insulating cement 30 to register the top surface of the microminiature element flush to within ± 0.005 inches of the top surface of the thin film circuitry. The gaps 31 are not, at this point, filled with insulating cement.

Figure 5:
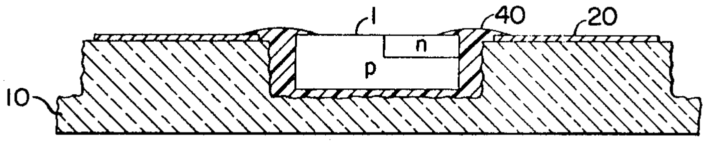
FIG. 5 is a cross-sectional view after the insulating cement has been deposited to fill up the gaps between the substrate and the circuit element.

FIG. 5 shows the assembly after the gaps 31 of FIG. 4 are filled. A small amount of cement overflow forms a bridge at 40. The process of filling the gaps may be accomplished by silk screening the cement through a mask which covers the area over the component or by spraying the cement through a suitable stencil. The cement is an admixture of insulating varnish, thixotroping agent and inert inorganic filler.

The insulating varnish used in the cement is a fluid solution of admixture containing a high temperature resin. Precursor solutions that produce aromatic polyimide or aromatic polyamide-imide resins are suitable examples. Aromatic polyimide resins and precursors therefor are described in U.S. Pat. Nos. 3,179,631, 3,179,632, 3,179,633 and 3,179,634 and reference may be made thereto for details on the methods of preparing such precursor solutions and solid resins. The aromatic polyamide-imide precursor solutions and solid resins are described and claimed in U.S. Pat. No. 3,179,635, assigned to the assignee of this invention, and reference may be made thereto for details on the methods of preparing those resins. Some solvents that may be used with these aromatic polyimide and aromatic polyamide-imide precursors are dimethyl acetamide and dimethyl sulfoxide. Others are described in the aforementioned patents. Polymeric methylene bridged diphenyl oxide resins are particularly suitable for the insulating varnish component o the cement binder. Such resins have outstanding humidity and thermal shock properties. Suitable methylene bridged diphenyl oxide resins and their preparation are described in application Ser. No. 571,138, filed Aug. 8, 1966 and reference may be made thereto for details on the methods of preparing such resins and varnishes. Some solvents that may be used with this resin are toluene and xylene. Others are described in the aforementioned application.

The cement also contains an inert, finely divided inorganic lithium aluminum silicate filler with a negative coefficient of thermal expansion. Examples of such inorganic lithium aluminum silicate fillers are derivatives of petalite, spodumene and eucryptite. Petalite is a disilicate of lithium and aluminum with small amounts of sodium and has the composition $Li_2O \cdot Al_2O_3 \cdot 8SiO_2$ or $LiAl(Si2O_5)_2$. It occurs in granite pegmatites with other lithium minerals. Spodumene is a metasilicate of lithium and aluminum with possible small amounts of sodium and chromium and has the composition $Li_2O \cdot Al_2O_3 \cdot 4SiO_2$ or $LiAl(SiO_3)_2$. It occurs in granite pegmatites with quartz, alkalic feldspars, muscovite, lepidolite, tourmaline, beryl, occasionally petalite, and with certain phosphate minerals. Eucryptite is a orthosilicate of aluminum and lithium and has the composition $Li_2O \cdot Al_2O_3 \cdot 2SiO_2$ or $LiAlSiO_4$. These fillers should be about 400 mesh (37 microns) or finer. The cement binder may also contain a flocculent thixotroping agent to prevent excessive flow out of the cement after screening.

Figure 6:
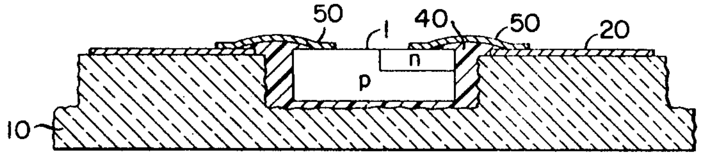
FIG. 6 is a cross-sectional view after the interconnecting conductors have been deposited.

In FIG. 6 metal interconnection conductors 50 are shown after having been deposited. The interconnection conductors that are commonly used are electrically conductive metals as for example aluminum, gold, silver, copper and base alloys thereof. The interconnections between the microminiature elements and the thin film circuitry on the substrate may be accomplished by thermocompression bonding, ultrasonic welding, vapor decomposition, cathode sputtering, using a conductive epoxy resin bridge or by vacuum evaporation of thin metallic films which are processed through a stencillike mask or photo etched to provide a geometrical configuration. The last method was found to be especially effective. It involves heating a material in a vacuum to such a temperature that a vapor pressure of less than $5 \times 10^{-6}$ torr is obtained. In this process the metal to be vaporized is placed on a high resistance filament connected between two low resistance bus bars. Large currents are passed through the bus bars and the metal vaporizes and condenses upon a suitably placed substrate which is marked to confine the deposit to the geometrical pattern desired.

Figure 7:
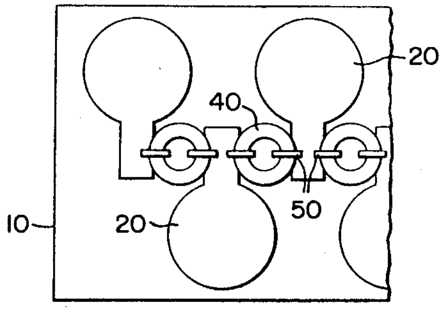
FIG. 7 is a plan view illustrating one type of a microminiature circuit device.

FIG. 7 is a plan view of the recessed type microminiature circuit device showing a plurality of thin film circuitry 20, insulating cement 40 covering part of the thin film circuitry and interconnection conductors 50.

Figure 8:
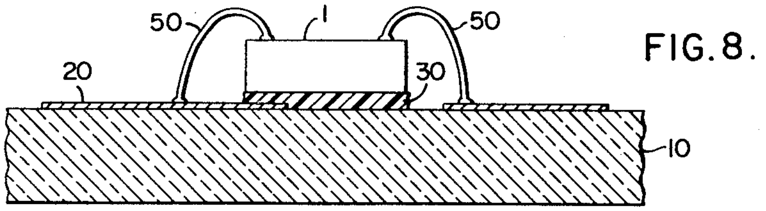
FIG. 8 is a cross-sectional view showing another embodiment of this invention.

FIG. 8 shows another embodiment of this invention wherein the microminiature element 1 is bonded to the substrate 10 with the cement of this invention 30 without being recessed. Also shown is the thin film circuitry 20 and thermocompression bonded metal interconnection conductors 50.

EXAMPLE 1

Dummy semiconductor chips to act as microminiature elements were first made from a suitable semiconductor material. A silicon substrate about 0.010 inches thick was used. It was coated with melted wax and positioned on a metal plate to hold it in place on a jig under an ultrasonic impact grinding machine. Hollow steel tubes having inside diameters of about 0.050 inch were used for drills and a water slurry of 280 mesh boron carbide was used as a grinding compound. The resulting semiconductor elements were then cleaned using standard ultrasonic cleaning chamber techniques for 15 minutes with trichloroethylene and 20 minutes with a de-ionized water and a sodium carbonate detergent, manufactured by Alconox Inc. of New York and sold under the trade name Alconox. This was followed by a de-ionized water rinse. The semiconductor elements were again put in the ultrasonic cleaning chamber and cleaned using standard ultrasonic techniques for 20 minutes with de-ionized water. The semiconductor elements were finally air dried. They measured about 0.050 inch in diameter and 0.010 inch in thickness.

Next, cavities were cut into the aluminum oxide substrate about 0.010 inch deep to within a 0.001 inch tolerance on ⅛-inch centers using ultrasonic impact grinding techniques. A drill stock, 1/16 inch outside diameter, was selected for the grinding tool. The drilled cavities actually measured 0.065 inch in diameter in the unglazed aluminum oxide substrate. The depth of the cavity was 0.010 with a deviation of ±0.003 inch.

A special jig was built to hold and register the substrates for drilling. The substrates were 2 inches square and arrived at the drilling table sized to fit the magazine of the microcircuit jig. They were coated with melted wax and positioned on a square template. The squared edge of the template was registered to the squared edge of the jig. All measurements were referenced to this corner. Permanently drilled in the jig was a set of holes parallel to the reference edges. The center of the pattern was also lined up along one of the center lines of the substrate. Four cavity patterns were drilled symmetrically about the center along cartesian coordinates. Another jig having the precise dimension of the vacuum deposition mask was built to check the substrates. The substrates were then removed from the templates and were cleaned following the procedure outlined above. They were then further cleaned with chromic-sulfuric acid followed by a de-ionized water rinse, then with isopropyl alcohol followed by drying with blown nitrogen gas. In preparation for deposition of gold thin film circuitry the substrate was precleaned using blown dry nitrogen gas then a pressure spray of equal parts reagent trade toluene, acetone and isopropyl alcohol followed by air drying. The gold thin film circuitry on the substrate was then deposited by vacuum deposition. Normal procedure involves initial evaporation of chromium to achieve adhesion at the surface of the substrate and then without breaking the vacuum, initiation of gold deposition simultaneously with the chromium, finally stopping the chromium evaporation but continuing the gold deposition to reach the desired thickness and/or conductivity of the gold conductors.

The semiconductor components were cemented into the cavities with the low coefficient of thermal expansion cement of this invention. A small amount of the cement was placed at the bottom of the cavity. The circuit element was positioned on top of the cement. The dummy chips were brought flush with the thin film circuitry on the substrate to within ± 0.005 inches by bottoming them in the cavity. The resin cement contained the following: polymeric diphenylene oxide resinuous varnish 48 weight percent (37.4 parts by weight), available commercially under the trade name Doryl B–109–3 from Westinghouse Electric Corporation; silica gel thixotroping agent available commercially under the trade name Cab-O-Sil from the Godfrey Cabot Company, 0.7 weight percent (0.6 parts by weight); an inert lithium filler of the formula $Li_2O\cdot Al_2O_3\cdot 8SiO_2$ manufactured by Foote Mineral Company and sold under the trade name SF Zerifac 51.3 weight percent (40.0 parts by weight). This lithium base filler has a negative coefficient of thermal expansion of about $-0.13 \times 10^{-6}$ per degrees C. It is important that the lithium base filler be 400 mesh or finer. The weight percent of the ingredients can vary ±5 percent with no adverse affect on thermal shock properties. In this formulation, the viscosity of the base B–109–3 varnish was controlled at 435 ± 5 centipoises at 25 ± 1° C. using a Brookfield Viscometer 01 spindle at 20 r.p.m. The cement formulation was ball milled 72 hours to yield a smooth thixotropic material.

The assembly was then cured as follows: a minimum of 2 hours at room temperature followed by 1 hour at 50° C., 65° C., 85° C., 100° C., 125° C., 175° C. and finally 2 hours at 200° C. to completely cure the resin bridging material and bond the elements in place. This cure schedule was essential to provide gradual solvent release from the compound.

Next, the gaps existing between the various components and the substrate were filled with the bridging cement. This was accomplished by silk screening through a mask which was forced into contact with the elements by the pressure of the squeegee. A small overlapping on the thin film circuitry and semiconductor chip was left to provide a smooth bridge for the interconnection conductor and to make sure there were no weak spots. The structure was again cured as described above to completely cure the resin bridging material and to provide a smooth crack free resin bridge.

The substrate and microcomponent assemblies were again predeposition cleaned as described above, placed in a fixture, and over the assembly a registered stencil type mask is mounted. Using vacuum depositing techniques, gold, interconnection conductors about 0.006 inch wide and about 0.0004 inch thick were deposited onto the area defined by the stencil so that the semiconductor chip and the thin film circuitry were interconnected by the gold conductors.

Thus the semiconductor chips were bonded to the substrate with an extremely low coefficient of thermal expansion insulating cement which provides an aluminum bridge which remains crack free and which can stand temperatures in the range of 300°C.

EXAMPLE II

In this experiment the circuit element was an integrated circuit device which was cemented directly to a thin gold pad on an aluminum oxide substrate. The resin cement contained the following: polymeric diphenylene resinous varnish 48 weight percent (37.4 parts by weight), available commercially under the trade name Doryl B–109–3 from Westinghouse Electric Corporation; silica gel thixotroping agent available commercially under the trade name Cal-O-Sil from the Godfrey Cabot Company, 0.7 weight percent (0.6 parts by weight); an inert lithium filler of the formula $Li_2O\cdot Al_2O_3\ 8SiO_2$ manufactured by Foote Mineral Company and sold under the trade name SF Zerifac 51.3 weight percent (40.0 parts by weight).

A small amount of the cement was spread evenly on the gold layer surface in the desired mounting location. The circuit element was pressed into the resin cement spreading. The substrate with the element bonded directly to the gold layer was then placed in a cam controlled oven at room temperature. The temperature was raised to 300° C. over a one hour period and held at 300° C. for one hour. It was found that the cured resin was capable of withstanding the bonding temperature required for C. wire bonding for many hours, although only a fraction of this time is required for the interconnection. This cement could also be used to bond circuit elements to other metallic layers on the substrate or to vitreous or organic insulating layers. This cement serves as a substitute for a metallic bond between substrate and the element with sufficient structural integrity and thermal stability to permit subsequent processing.

We claim:

1. A microminiature circuit device comprising a substrate, thin film circuitry on said substrate, a plurality of microminiature elements mounted on the substrate, a high temperature resinous cement containing a finely divided inner filler having a negative coefficient of thermal expansion bonding the microminiature element onto the substrate, and a plurality of metallic interconnection conductors running from the microminiature elements to the thin film circuitry.

2. The device of claim 1 wherein the substrate has a plurality of hollow cavities therein, the microminiature elements are mounted in said cavities so that they are recessed and spaced from the cavity surfaces, the cement bonding the microminiature elements into the cavities, spacing the elements from the cavity surface and forming a bridge from the microminiature elements to the thin film circuitry and the plurality of interconnection conductors are deposited over the cement bridge.

3. The device of claim 1 wherein the cement comprises a resinous varnish containing a resin selected from the group consisting of aromatic polyimides, aromatic polyamide-imides, methylene bridged diphenyl oxides, an inert finely divided inorganic filler selected from the group consisting of $Li_2O\cdot Al_2O_3\cdot 8SiO_2$, $Li_2O\ Al_2O_3\cdot 4SiO_2$, $Li_2O\cdot Al_2O_3\cdot 2SiO_2$ and a thixotroping agent.

4. The device of claim 1 wherein the plurality of metal interconnection conductors are selected from the group consisting of gold, aluminum, silver, copper and base alloys thereof and wherein the substrate is selected from the group consisting of soda lime glass, borosilicate glass, fused silica glass, aluminum oxide and beryllium oxide.

5. The device of claim 1 wherein the microminiature element is a silicon microdot chip semiconductor, the metallic interconnection conductors are gold, the substrate is aluminum oxide, and the resinous varnish contains the resin methylene bridged diphenyl oxide.